United States Patent
Takeyasu et al.

(10) Patent No.: US 11,257,239 B2
(45) Date of Patent: Feb. 22, 2022

(54) IMAGE SELECTION DEVICE AND IMAGE SELECTION METHOD

(71) Applicant: TOYOTA JIDOSHA KABUSHIKI KAISHA, Toyota (JP)

(72) Inventors: Satoshi Takeyasu, Musashino (JP); Daisuke Hashimoto, Chofu (JP); Kota Hirano, Tokyo-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 55 days.

(21) Appl. No.: 16/658,816

(22) Filed: Oct. 21, 2019

(65) Prior Publication Data
US 2020/0134850 A1   Apr. 30, 2020

(30) Foreign Application Priority Data
Oct. 24, 2018   (JP) .............................. JP2018-200056

(51) Int. Cl.
*G06T 7/62*   (2017.01)
*G06T 7/00*   (2017.01)
*G06K 9/00*   (2022.01)
*G06T 7/70*   (2017.01)

(52) U.S. Cl.
CPC ............. *G06T 7/62* (2017.01); *G06K 9/00805* (2013.01); *G06T 7/70* (2017.01); *G06T 7/97* (2017.01); *G06T 2207/20081* (2013.01); *G06T 2207/30261* (2013.01)

(58) Field of Classification Search
CPC .... G06T 7/62; G06T 7/97; G06T 7/70; G06K 9/00805
See application file for complete search history.

(56) References Cited

U.S. PATENT DOCUMENTS

| | | | |
|---|---|---|---|
| 9,563,955 B1* | 2/2017 | Kamarshi | G06K 9/00791 |
| 2009/0303077 A1* | 12/2009 | Onome | G08G 1/096716 |
| | | | 340/901 |
| 2017/0053409 A1* | 2/2017 | Yamamoto | G06K 9/00362 |

OTHER PUBLICATIONS

Wei Liu et al., "SSD: Single Shot MultiBox Detector", ECCV2016, 2016, 17 pages.
Shaoqing Ren et al., "Faster R-CNN: Towards Real-Time Object Detection with Region Proposal Networks", NIPS, 2015, 14 pages.
Alex Kendall et al., "Multi-Task Learning Using Uncertainty to Weigh Losses for Scene Geometry and Semantics", CVPR2018, 2018, 14 pages.

* cited by examiner

Primary Examiner — Myron Wyche
(74) Attorney, Agent, or Firm — Sughrue Mion, PLLC

(57) ABSTRACT

An image selection device includes a processor configured to: input, for each of a series of images acquired from a camera mounted on a vehicle, the image to a classifier to detect a region including an object represented on the image; track the detected object over the series of images; and select, when a period in which the detected object can be tracked is equal to or more than a predetermined period, and a size of a region including the detected object in any one image during the period in which the object can be tracked is equal to or more than a predetermined size threshold value, among the series of images, an image immediately before the period in which the object can be tracked, or an image in which the tracked object is not represented during the period in which the object can be tracked.

8 Claims, 6 Drawing Sheets

IMAGE SELECTION DEVICE AND IMAGE SELECTION METHOD

FIELD

The present invention relates to an image selection device and an image selection method that select an image acquired by an imaging unit mounted on a vehicle.

BACKGROUND

Heretofore, a technique for detecting an object represented in an image has been studied. In recent years, a technique for improving detection accuracy by using a so-called deep neural network (hereinafter, simply referred to as a DNN) as a classifier in order to detect an object has been proposed (e.g., refer to Wei Liu et al., "SSD: Single Shot MultiBox Detector", ECCV2016, 2016 (hereinafter, referred to as NPL 1) and Shaoqing Ren et al., "Faster R-CNN: Towards Real-Time Object Detection with Region Proposal Networks", NIPS, 2015 (hereinafter, referred to as NPL 2)).

With such a technique, by training a classifier using, as teacher data, a great number of images representing a known object, the classifier becomes able to highly accurately detect the known object represented on an input image. However, detection accuracy by a classifier deteriorates for an image what it is difficult to include in teacher data, such as an image representing a special situation. On the other hand, a technique for improving detection accuracy by weighting a plurality of loss functions in consideration of homoscedastic uncertainty between respective tasks in a multi-task DNN has been proposed (e.g., refer to Alex Kendall et al., "Multi-Task Learning Using Uncertainty to Weigh Losses for Scene Geometry and Semantics", CVPR2018, 2018 (hereinafter, referred to as NPL 3)).

SUMMARY

However, it may become difficult to apply the technique described in NPL 3 when a calculation amount is great and a calculation resource available for detection of an object is limited, or when real-time performance is demanded. It is not preferable to make an attempt to record all images generated by an in-vehicle camera during running of a vehicle in order to acquire image data available as teacher data, because this requires mounting of a memory having a significantly great capacity on a vehicle, or continuously transmitting images to an instrument outside a vehicle, such as a server, via a wireless communication terminal. Thus, it is required to suitably select an image suited to be utilized as teacher data for learning of a classifier.

Therefore, an object of the present invention is to provide an image selection device capable of suitably selecting an image suited to be utilized as teacher data for learning of a classifier.

According to one embodiment, an image selection device is provided. This image selection device includes a processor configured to: input, for each of a series of images acquired from a camera mounted on a vehicle, the image to a classifier which has been learned in such a way as to detect an object, to detect an object represented on the image, and a region in which the object is included on the image; track the detected object over the series of images; and select, when a tracking period in which the detected object is tracked is equal to or more than a predetermined period, and a size of a region including the detected object in any one image during the tracking period among the series of images is equal to or more than a predetermined size threshold value, among the series of images, an image immediately before the tracking period, or an image in which the tracked object is not detected during the tracking period.

In this image selection device, it is preferable that, when a size of a region including the detected object in a first image in the tracking period is equal to or more than the predetermined size threshold value, the processor selects an image immediately before the tracking period.

Further, in this image selection device, it is preferable that the classifier further outputs, for each of the series of images, a confidence score representing likelihood that an object is represented on the image and only when the confidence score for the tracked object is equal to or more than a predetermined confidence threshold value in an image immediately before the tracking period or an image in which the tracked object is not detected during the tracking period, the processor selects the image.

Still further, in this image selection device, it is preferable that the classifier further outputs a kind of the detected object for each of the series of images, and the processor is further configured to set the predetermined size threshold value according to the kind of the detected object.

Still further, in this image selection device, it is preferable that the classifier further outputs a kind of the detected object for each of the series of images, and the processor is further configured to store a kind of an object tracked during the tracking period, together with the selected image.

Still further, in this image selection device, it is preferable that, only when another object is not detected in an image in which the tracked object is not detected during the tracking period, or another object detected in images before and after an image in which the tracked object is not detected is not located within a predetermined range of the tracked object, the processor selects an image in which the tracked object is not detected.

According to another embodiment of the present invention, an image selection method is provided. This image selection method includes: inputting, for each of a series of images acquired from a camera mounted on a vehicle, the image to a classifier which has been learned in such a way as to detect an object, to detect an object represented on the image, and a region in which the object is included on the image; tracking the detected object over the series of images; and selecting, when a tracking period in which the detected object can be tracked is equal to or more than a predetermined period, and a size of a region including the detected object in any one image during the tracking period among the series of images is equal to or more than a predetermined size threshold value, among the series of images, an image immediately before the tracking period, or an image in which the tracked object is not detected during the tracking period.

According to still another embodiment of the present invention, an image selection device is provided. This image selection device includes a processor configured to: input, for each of a series of images acquired from a camera mounted on a vehicle, the image to a classifier which has been learned in such a way as to detect an object, to detect an object represented on the image; track the detected object over the series of images; and select, when a period in which the detected object is tracked is less than a predetermined period, any one image during the period in which the detected object is tracked, among the series of images.

An image selection device according to the present invention provides an advantageous effect of being able to suitably select an image suited to be utilized as teacher data for learning of a classifier.

DESCRIPTION OF EMBODIMENTS

An image selection device will be described below with reference to the drawings. This image selection device inputs each of a series of time-series images acquired by a camera mounted on a vehicle and representing periphery of the vehicle to a classifier which has been learned for object detection, to detect an object represented on the images. This image selection device tracks the detected object, and when a period in which the object can be tracked is equal to or more than a predetermined period, and a size of a region including the detected object in any one image during the period in which the object can be tracked among the series of images is equal to or more than a predetermined size threshold value, the image selection device then selects, among the series of images, an image immediately before the period in which the object can be tracked, or an image that does not represent the tracked object during the period in which the object can be tracked. Thus, this image selection device can select an image in which there is a high possibility that detection of an object has been failed for some reason. The image from which the classifier has unsuccessfully detected an object is suited as teacher data for learning of the classifier. Therefore, this image selection device can select an image suited to teacher data for learning of the classifier.

An example in which an image selection device is applied to a vehicle control system is described below. In this example, an image selection device selects an image by executing image selection processing for an image acquired by a camera mounted on a vehicle, and transmits the selected image to a server outside the vehicle via an on-board wireless communication terminal. Further, this image selection device utilizes a result of detection of an object from the image for driving control of the vehicle.

Figure 1:
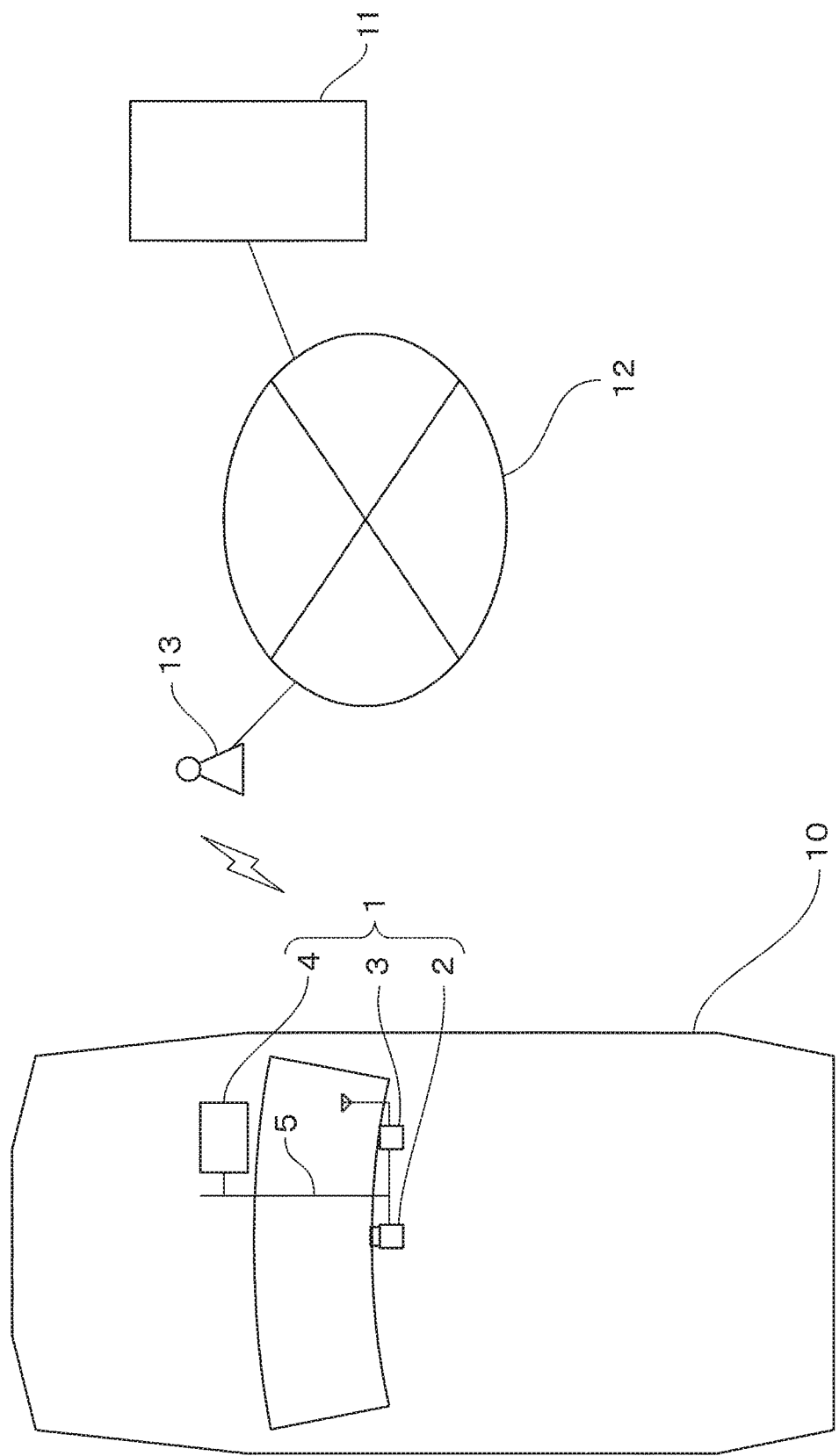
FIG. 1 is a schematic configuration diagram of a vehicle control system on which an image selection device is mounted.
Figure 2:
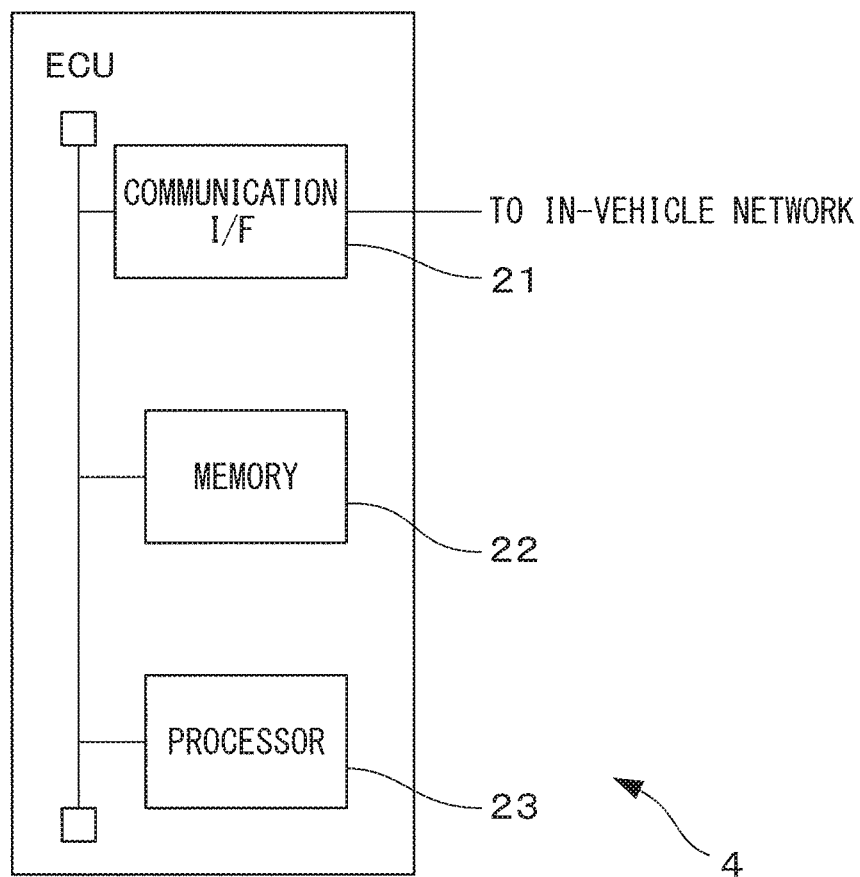
FIG. 2 is a hardware configuration diagram of an electronic control unit being one embodiment of an image selection device.

FIG. 1 is a schematic configuration diagram of a vehicle control system on which an image selection device is mounted. FIG. 2 is a hardware configuration diagram of an electronic control unit being one embodiment of an image selection device. In the present embodiment, a vehicle control system 1 which is mounted on a vehicle 10 and controls the vehicle 10 includes a camera 2 for imaging periphery of the vehicle 10, a wireless communication terminal 3, and an electronic control unit (ECU) 4 being one example of an image selection device. The camera 2, the wireless communication terminal 3, and the ECU 4 are communicably connected to one another via an in-vehicle network 5 compliant with a standard such as a controller area network.

The camera 2 is one example of an imaging unit, and includes a two-dimensional detector configured with an array of photoelectric conversion elements sensitive to visible light such as a CCD or a C-MOS, and an imaging optical system which forms an image of a region to be imaged on the two-dimensional detector. The camera 2 is mounted, for example, inside a vehicle room of the vehicle 10 in such a way that it is oriented in in a forward direction of the vehicle 10. The camera 2 captures a forward region of the vehicle 10 every predetermined imaging period (e.g., 1/30 seconds to 1/10 seconds), and generates an image representing the forward region. An image acquired by the camera 2 may be a color image or a gray image.

Every time the camera 2 generates an image, the camera 2 outputs the generated image to the ECU 4 via the in-vehicle network 5.

The wireless communication terminal 3 is one example of a communication unit, and is an instrument that executes wireless communication processing compliant with a predetermined wireless communication standard. For example, the wireless communication terminal 3 is connected to a server 11 via a wireless base station 13 and a communication network 12 by accessing the wireless base station 13 connected, via a gateway (not illustrated) or the like, to the communication network 12 connected to the server 11. By including an image received from the ECU 4 and the like in a radio signal and then transmitting the radio signal to the wireless base station 13, the wireless communication terminal 3 transmits the image and the like to the server 11.

The ECU 4 controls the vehicle 10. In the present embodiment, the ECU 4 controls the vehicle 10 in such a way as to automatically drive the vehicle 10 on the basis of an object detected from a series of time-series images acquired by the camera 2. For this purpose, the ECU 4 includes a communication interface 21, a memory 22, and a processor 23.

The communication interface 21 is one example of an in-vehicle communication unit, and includes an interface circuit for connecting the ECU 4 to the in-vehicle network 5. In other words, the communication interface 21 is connected to the camera 2 via the in-vehicle network 5. Each time the communication interface 21 receives an image from the camera 2, the communication interface 21 transfers the received image to the processor 23.

The memory 22 is one example of a storage unit, and includes, for example, a volatile semiconductor memory and a non-volatile semiconductor memory. The memory 22 stores various data used in image selection processing executed by the processor 23 of the ECU 4, for example, an image received from the camera 2, various parameters for identifying a classifier utilized in image selection processing, various threshold values utilized in image selection processing, and the like. Further, the memory 22 may store map information.

The processor 23 is one example of a control unit, and includes one or a plurality of central processing units (CPUs) and peripheral circuits thereof. The processor 23 may further include another arithmetic circuit such as a logical arithmetic unit, a numerical arithmetic unit, or a graphic processing unit. While the vehicle 10 is running, each time the processor 23 receives an image from the camera 2, the processor 23 executes image selection processing for the received image. Further, the processor 23 controls the vehicle 10 in such a way as to automatically drive the vehicle 10 on the basis of an object around the vehicle 10 detected from the received image.

Figure 3:
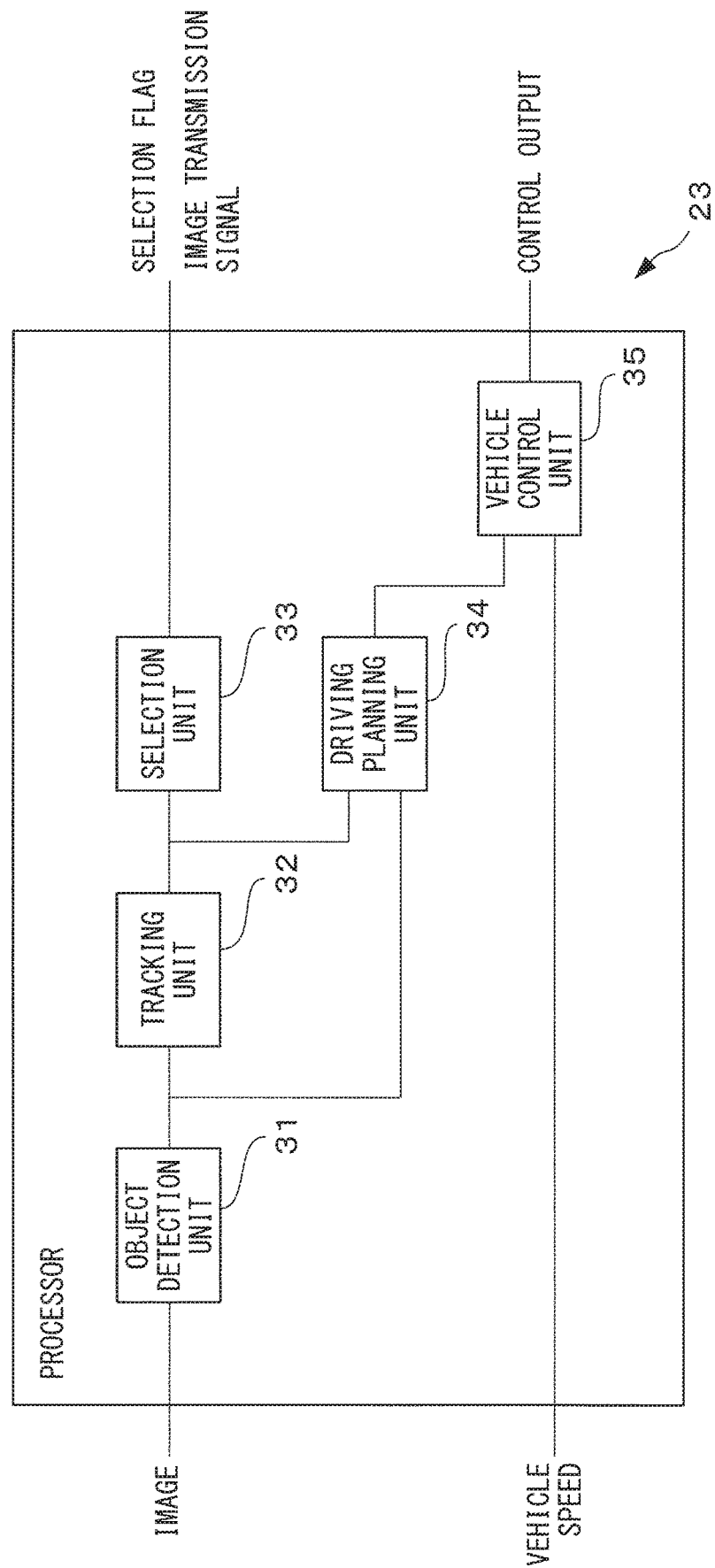
FIG. 3 is a functional block diagram of a processor of the electronic control unit, relating to vehicle control processing including image selection processing.

FIG. 3 is a functional block diagram of the processor 23 of the ECU 4, relating to vehicle control processing including image selection processing. The processor 23 includes an object detection unit 31, a tracking unit 32, a selection unit 33, a driving planning unit 34, and a vehicle control unit 35. Each of these units included in the processor 23 is, for example, a function module implemented by a computer program operating on the processor 23. Alternatively, each of these units included in the processor 23 may be a dedicated arithmetic circuit provided in the processor 23. Among the respective units included in the processor 23, the object detection unit 31, the tracking unit 32, and the selection unit 33 execute image selection processing.

The object detection unit 31 detects an object represented in each of a series of time-series images generated by the camera 2, and identifies a region including the object.

For example, each time the object detection unit 31 acquires an image from the camera 2, the object detection unit 31 stores the image in the memory 22 and inputs the image to a classifier, to detect an object represented in the input image. For example, as such a classifier, the object detection unit 31 can use a deep neural network (DNN) which has been learned or trained in such a way as to detect, from an input image, an object represented in the image. As such a DNN, the object detection unit 31 can use a DNN having a convolutional neural network type architecture, such as a Single Shot MultiBox Detector (SSD) described in NPL 1, or a faster R-CNN described in NPL 2. In this case, the object detection unit 31 inputs an image to a DNN type classifier, and thereby, the classifier calculates, for each kind (e.g., an automobile, a person, and a road sign) of an object to be detected in various regions on the input image, a confidence score representing likelihood that the kind of the object is represented in the region, and determines that, in a region in which a confidence score for any kind of an object is equal to or more than a predetermined detection threshold value, the kind of the object is represented. The classifier outputs information representing a region (e.g., a circumscribed rectangle of the object to be detected; hereinafter, referred to as an object region) including the object to be detected on the input image, and information representing the kind of the object represented in the object region.

Alternatively, the object detection unit 31 may use a classifier other than a DNN. For example, the object detection unit 31 may use, as a classifier, a support vector machine (SVM) which has been learned in such a way as to input a feature (e.g., Histograms of Oriented Gradients, HOG) calculated with respect to a window set on an image, and output a confidence score that an object to be detected is represented on the window. The object detection unit 31 calculates, while variously changing a position, a size, and an aspect ratio of a window to be set on an image, from the feature with respect to the window, and calculates the confidence score with regard to the window, by inputting the calculated feature to the SVM. When the confidence score is equal to or more than a predetermined detection threshold value, the object detection unit 31 determines the window as an object region in which the object to be detected is represented.

The object detection unit 31 outputs a position and a range of the object region detected from the image, and a kind of the detected object to the tracking unit 32 and the driving planning unit 34.

The tracking unit 32 tracks an object detected from a series of images in accordance with a predetermined tracking scheme. For example, by executing viewpoint conversion processing by using information such as a position of attachment of the camera 2 to the vehicle 10 for each image, the tracking unit 32 converts the image into a bird's-eye image. In this instance, the tracking unit 32 may estimate a distance from the vehicle 10 to the detected object on the basis of a size of the detected object region on the image, and identify a position of each point on the detected object on the bird's-eye image on the basis of the estimated distance. For example, for each kind of an object to be detected, a reference size of the object on an image when a distance from the vehicle 10 to the object is a predetermined reference distance is previously stored in the memory 22. The tracking unit 32 can calculate, as the estimated distance to the detected object, a distance acquired by multiplying the reference distance by a ratio of the reference size corresponding to the detected object to the size of the object region detected on the image. The tracking unit 32 associates, by executing tracking processing using a Kalman Filter, a Particle Filter, or the like for a series of bird's-eye images, identical ones of the detected objects among the respective bird's-eye images, and thereby tracks the object detected from the series of images.

Alternatively, the tracking unit 32 may track an object detected from a series of images by associating the object detected from a latest image with the object detected from a past image in accordance with tracking processing based on an optical flow.

By attaching a label to an object region of each of images in which objects associated as the same object among a series of images are represented, the label being different from that of an object region in which another object is represented, the tracking unit 32 discriminates, for each tracked object, the object region in which the object is represented. For each tracked object, the tracking unit 32 notifies the selection unit 33 of the label associated with the object, and the object region of each image to which the label is attached. Further, the tracking unit 32 outputs, to the driving planning unit 34, the tracking result such as a position of each tracked object on each bird's-eye image.

For each tracked object, the selection unit 33 selects, from among a series of images, an image in which the object is represented but there is a possibility that detection of the object has been failed.

In the present embodiment, among the tracked objects, the selection unit 33 selects an object that can be tracked over a predetermined period (e.g., 1 second to 30 seconds) or more, i.e., an object detected in each of images successively acquired over the predetermined period or more. In relation to the selected object, when a size of an object region in which the object is represented is equal to or more than a predetermined size threshold value in any one of images acquired in the period in which the object is being tracked, the selection unit 33 selects an image immediately before an image in which the object is detected for the first time. Note that a size of an object region may be, for example, an area of an object region, width or height of an object region, or length of a diagonal line of an object region.

When a detected object has some size on an image, there is a possibility that the object is also represented in an image immediately before tracking of the object is started. Thus, in an image immediately before tracking of the object is started, there is a possibility that detection of the object has been failed. Accordingly, by selecting such an image, the selection unit 33 can select an image suited for learning of a classifier.

Note that the selection unit 33 preferably designates, as a first image in which tracking is started, an image in which a size of an object region representing a detected object is compared with the size threshold value. When an object detected with a certain size or more when the tracking is started is represented, there is a high possibility that the object substantially having the size is also represented in an image immediately before the tracking is started, and therefore, the selection unit 33 can more suitably select an image in which there is a possibility that detection of an object has been failed.

Furthermore, it is preferable that the size threshold value is set in accordance with a kind of a detected object. In this instance, it is preferable that a greater size threshold value is set for a kind of an object having a greater standard size. For example, it is preferable that the size threshold value regarding a large vehicle such as a bus or a truck is greater than the size threshold value regarding a standard-sized car. Similarly, it is preferable that the size threshold value regarding a standard-sized car is greater than the size threshold value regarding a person or a motorbike. In this case, the size threshold value for each kind of an object is previously stored in the memory 22. The selection unit 33 may read the size threshold value in accordance with a kind of a tracked object of interest from the memory 22, and then use the size threshold value for comparison with a size of an object region in which the object is represented. In this way, by setting a size threshold value in accordance with a kind of a detected object, the selection unit 33 can more suitably select an image in which there is a possibility that detection has been failed with regard to the object.

Figure 4:
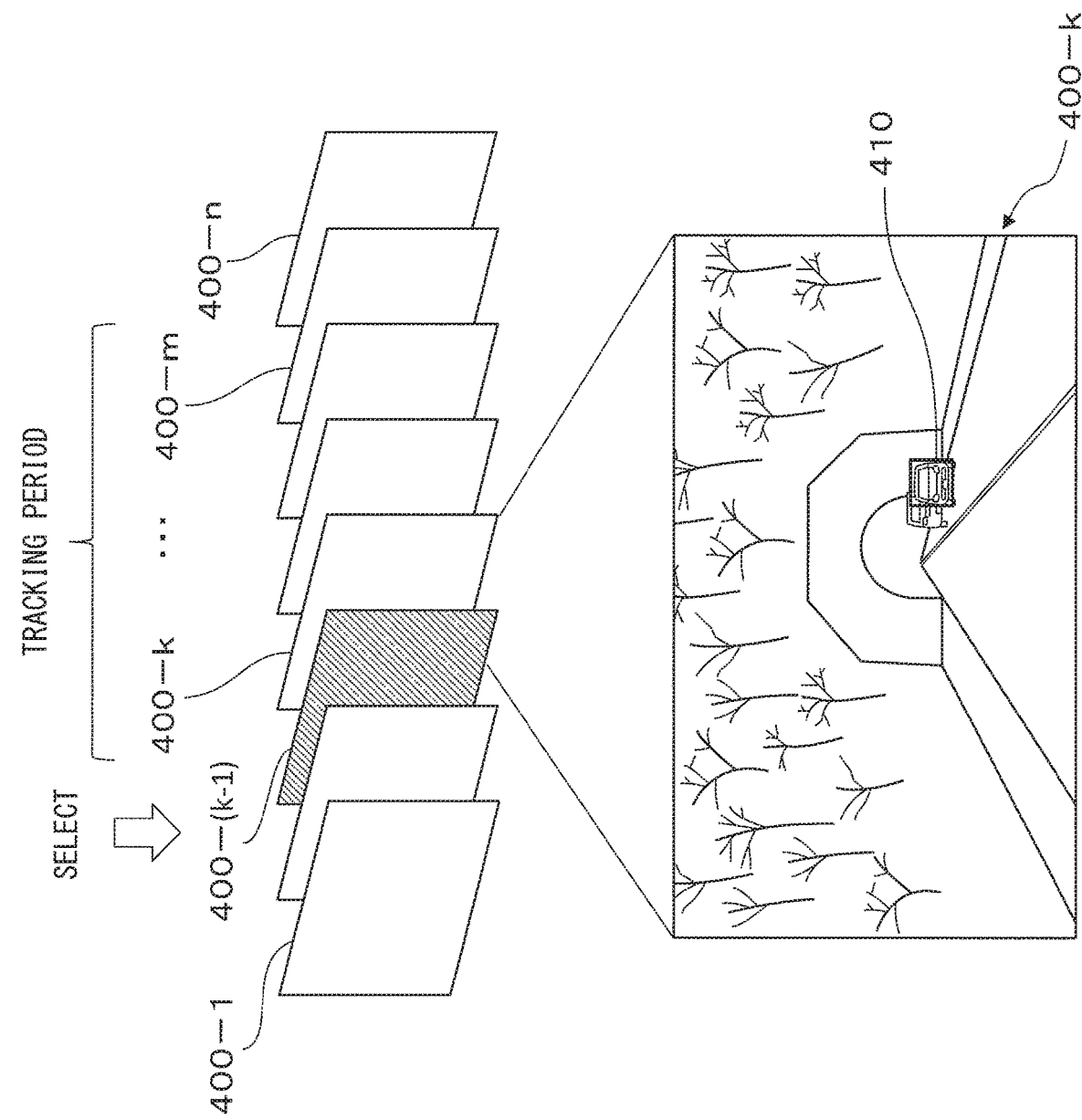
FIG. 4 is a diagram explaining an outline of the image selection processing.

FIG. 4 is a diagram explaining an outline of the image selection processing. As illustrated in FIG. 4, among a series of images 400-1 to 400-$n$ (n is an integer of 3 or more) acquired by the camera 2, a vehicle is detected in images 400-$k$ to 400-$m$ (k>1, and, k<m≤n), and tracked (i.e., a period in which the images 400-$k$ to 400-$m$ are acquired is a tracking period). It is assumed that, in the image 400-$k$, a size of an object region 410 in which the tracked vehicle is represented is equal to or more than a size threshold value. In this case, an image 400-($k$−1) is selected.

According to a modification example, only when a confidence score for a kind of a tracked object calculated with regard to any region on an image immediately before an image in which the tracked object is detected for the first time by a classifier used by the object detection unit 31 is equal to or more than a predetermined confidence threshold value, the selection unit 33 may select the image immediately before the image in which the tracked object is detected for the first time. Note that the confidence score threshold value is set to a value lower than a detection threshold value used to determine whether or not an object is represented. In this way, by selecting an image including a region in which a confidence score for a kind of a tracked object is high to a certain degree, the selection unit 33 can inhibit selection of an image in which an object to be detected is not actually represented.

With regard to a selected image, the selection unit 33 associates a flag representing that the image is selected (hereinafter, simply referred to as a selection flag). Further, with regard to the selected image, the selection unit 33 may associate information representing a kind of a tracked object that serves as a ground for the selection with the selected image.

The selection unit 33 may erase, from the memory 22, an image for which a certain period (e.g., 1 minute to 10 minutes) or more has passed since acquisition of the image from the camera 2 and with which a selection flag is not associated, among images stored in the memory 22.

For every constant period, each time a predetermined number of images are selected, or when the engine of the vehicle 10 is stopped, the selection unit 33 reads, from the memory 22, an image with which a selection flag is associated, and generates an image transmission signal including the read image. The selection unit 33 transmits the image transmission signal to the server 11 by outputting the image transmission signal to the wireless communication terminal 3 via the communication interface 21. In this instance, when information representing a kind of a tracked object is associated with the image with which the selection flag is associated, the selection unit 33 may also include the information representing the kind of the tracked object in the image transmission signal. Consequently, the selection unit 33 can facilitate identification of an object having a possibility of being unsuccessfully detected in a selected image.

After transmitting the selected image to the server 11, the selection unit 33 may erase the selected image from the memory 22.

The driving planning unit 34 generates one or more trajectories to be traveled of the vehicle 10 in such a way that another object detected for each image and existing around the vehicle 10 does not collide with the vehicle 10. A trajectory to be traveled is represented as, for example, a set of target positions for the vehicle 10 at the respective times from the current time to a certain time later. For example, the driving planning unit 34 estimates a trajectory of each tracked object up to a certain time later, based on the path of each tracking object obtained by the tracking result by the tracking unit 32. On the basis of the estimated trajectory of each tracked object, the driving planning unit 34 generates a trajectory to be traveled of the vehicle 10 in such a way that a prediction value of a distance between each tracked object and the vehicle 10 up to a certain time later becomes equal to or more than a predetermined distance with regard to each tracked object. In this instance, for example, with reference to current position information of the vehicle 10 acquired from a GPS receiver (not illustrated) mounted on the vehicle 10, and map information stored in the memory 22, the driving planning unit 34 may confirm a number of lanes on which the vehicle 10 can run. When a plurality of lanes on which the vehicle 10 can run exist, the driving planning unit 34 may generate a trajectory to be traveled in such a way as to change the lane on which the vehicle 10 runs.

Note that the driving planning unit 34 may generate a plurality of trajectories to be traveled. In this case, among the plurality of trajectories to be traveled, the driving planning unit 34 may select a trajectory in which a sum of absolute values of acceleration of the vehicle 10 becomes minimum.

The driving planning unit 34 notifies the vehicle control unit 35 of the generated trajectory to be traveled.

The vehicle control unit 35 controls each unit of the vehicle 10 in such a way that the vehicle 10 runs along the informed trajectory to be traveled. For example, the vehicle control unit 35 calculates a target acceleration of the vehicle 10 according to the informed trajectory to be traveled, and a current speed of the vehicle 10 measured by a vehicle speed sensor (not illustrated), and sets an accelerator position or a brake pedal position in such a way as to achieve the target acceleration. The vehicle control unit 35 then calculates an amount of fuel consumption depending on the set accelerator position, and outputs a control signal corresponding to the amount of fuel consumption to a fuel injection device of an engine of the vehicle 10. Alternatively, the vehicle control unit 35 outputs a control signal corresponding to the set brake pedal position to a brake of the vehicle 10.

Furthermore, when the vehicle 10 changes its course in order to travel along a trajectory to be traveled, the vehicle control unit 35 calculates a target steering angle for the vehicle 10 according to the trajectory to be traveled, and outputs a control signal corresponding to the target steering angle to an actuator (not illustrated) that controls a steering wheel of the vehicle 10.

Figure 5:
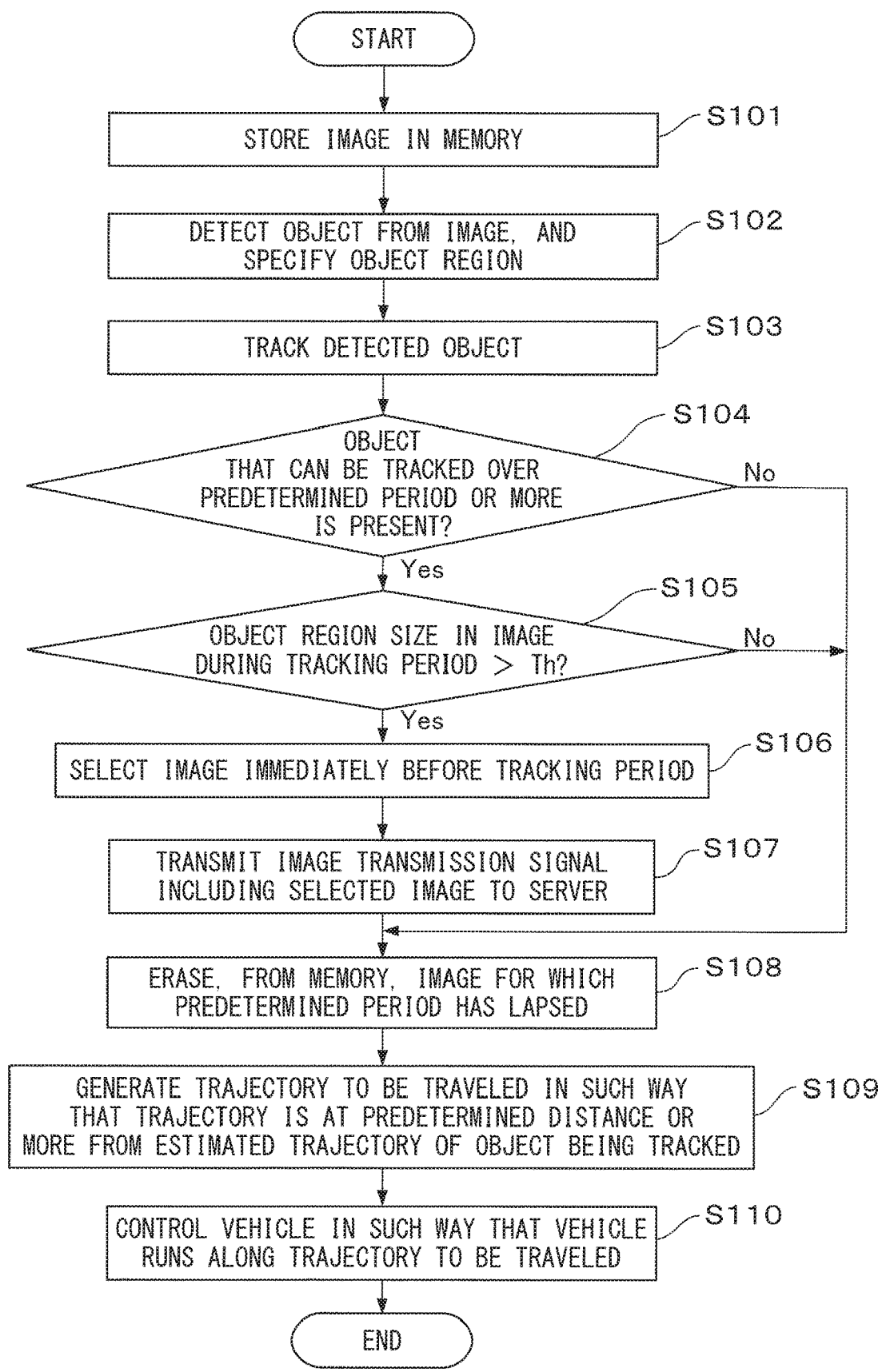
FIG. 5 is a flowchart illustrating an operation of vehicle control processing including image selection processing.

FIG. 5 is a flowchart illustrating an operation of vehicle control processing including image selection processing executed by the processor 23. Each time the processor 23 receives an image from the camera 2, the processor 23 executes vehicle control processing in accordance with the operation flowchart illustrated in FIG. 5. Note that, in the operation flowchart presented below, processing steps from step S101 to S108 correspond to the image selection processing.

The object detection unit 31 of the processor 23 stores, in the memory 22, a latest image acquired from the camera 2 (step S101). The object detection unit 31 detects an object from the latest image, and specifies an object region in which the detected object is represented (step S102).

The tracking unit 32 of the processor 23 tracks an object detected from a past image and a latest image (step S103). The selection unit 33 of the processor 23 determines whether or not an object that can be tracked over a predetermined period or more is present among objects being tracked (step S104). When an object that can be tracked over the predetermined period or more is present (Yes in step S104), the selection unit 33 determines whether or not a size of an object region including the tracked object is equal to or more than a predetermined size threshold value Th in any one of images in a period in which the object is tracked (step S105).

When the size of the object region is equal to or more than the predetermined size threshold value Th in any one of images (Yes in step S105), the selection unit 33 selects an image immediately before the period in which the object is tracked, among images stored in the memory 22 (step S106). The selection unit 33 generates an image transmission signal including the selected image, and transmits the generated image transmission signal to the server 11 via the wireless communication terminal 3 (step S107).

After step S107, in the step S104, when an object that can be tracked over a predetermined period or more is not present (No in step S104), or in step S105, when an image in which a size of the object region is equal to or more than the predetermined size threshold value Th is not present (No in step S105), the selection unit 33 erases, from the memory 22, an image for which a predetermined time has passed since acquisition of the image from the camera 2 (step S108).

The driving planning unit 34 of the processor 23 generates a trajectory to be traveled of the vehicle 10 in such a way that the trajectory to be traveled is at a predetermined distance or more from an estimated trajectory of an object being tracked (step S109). The vehicle control unit 35 of the processor 23 controls the vehicle 10 in such a way that the vehicle 10 runs along the trajectory to be traveled (step S110). Then the processor 23 ends the vehicle control processing.

As has been described above, this image selection device inputs each of a series of time-series images generated by a camera mounted on a vehicle to a classifier, and thereby detects an object from each image and tracks the detected object. With regard to an object that can be tracked over a certain period or more, when a size of an object region including the tracked object in any one image in the period in which the object is being tracked is equal to or more than a predetermined size threshold value, this image selection device selects an image immediately before the period. Consequently, this image selection device can select an image in which the tracked object is represented but there is a possibility that detection of the tracked object has been failed. Utilizing an image in which detection of an object has been failed for training a classifier is useful for improvement of accuracy in detection of the object by the classifier. Therefore, this image selection device is able to suitably select an image suited to be utilized as teacher data for learning of the classifier.

According to a modification example, the selection unit 33 does not need to transmit a selected image to the server 11. In this case, for example, when maintenance of the vehicle 10 is performed or the like, an external instrument for reading data stored in the memory 22 may be connected to the in-vehicle network 5. A selected image may be read from the memory 22 to the external instrument connected to the in-vehicle network 5 via the communication interface 21. According to this modification example, the image selection device can reduce a load on wireless communication. Moreover, according to this modification example, the wireless communication terminal 3 may be omitted.

According to another modification example, regarding an object tracked up to an image immediately acquired before a latest image acquired by the camera 2, when the tracked object is not detected in the latest image, and when an object is again detected in an image acquired later and the kind of the detected object is the same as the kind of the tracked object, the tracking unit 32 may determine that the detected object is the same as the tracked object and may continue tracking the tracked object. In this instance, the tracking unit 32 may predict, on the basis of a trajectory of the tracked object, a position of the tracked object on an image when the object is again detected by applying a Kalman Filter or the like, and continue tracking the tracking object only when a difference between the predicted position and a position of the detected object is less than a predetermined distance threshold value. In this case, when a period in which tracking of the object is continued is equal to or more than a predetermined period, and a size of an object region in which the tracked object is represented in any one image in the period in which the tracking is continued is equal to or more than a predetermined size threshold value, the selection unit 33 may select an image in which, during the period in which tracking of an object is continued, the object is not detected. In this case as well, there is a possibility that, for an image in which the tracked object is not detected, the detection of the tracked object is failed. Thus, in this modification example as well, the selection unit 33 can select an image suited to be utilized as teacher data for learning of a classifier. Note that, in this case, an image in which a size of an object region representing the detected and tracked object is compared with a predetermined size threshold value is preferably an image immediately before or immediately after an image in which the tracked object is not detected. Consequently, the selection unit 33 can more suitably select an image in which there is a possibility that the detection of the tracked object has been failed. Moreover, in this modification example as well, only when a confidence score for a kind of the tracked object is equal to or more than a predetermined confidence threshold value in an image in which the tracked object is not detected, the selection unit 33 may select the image.

Figure 6:
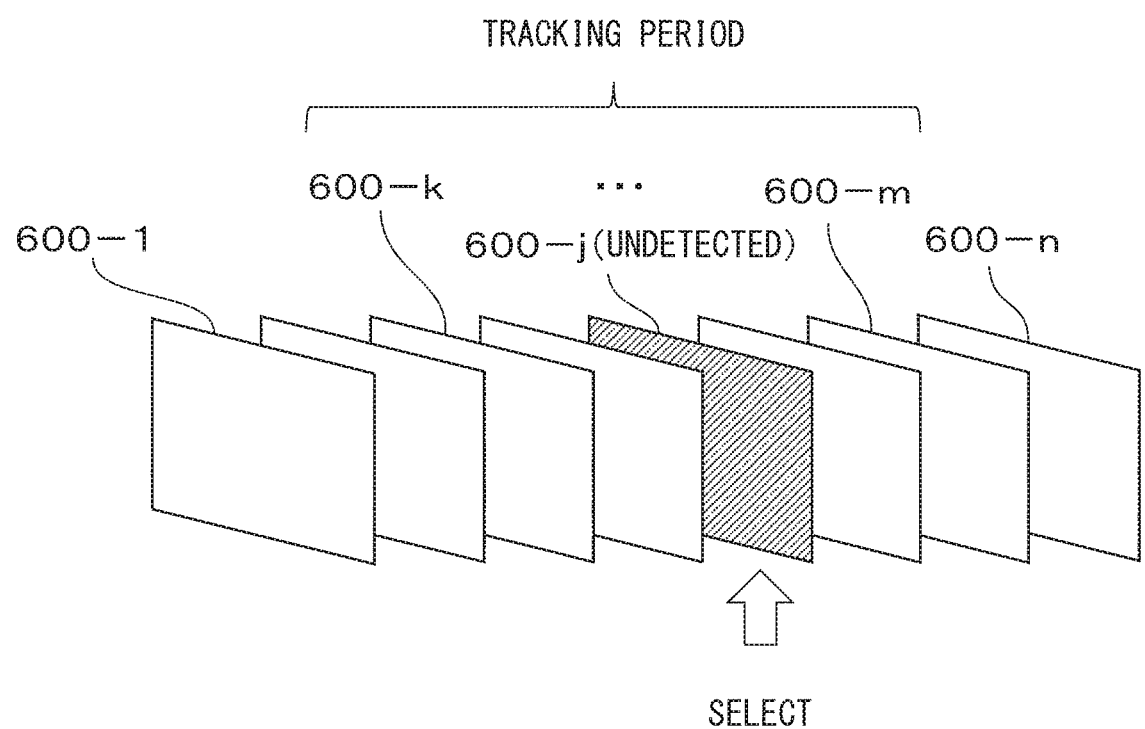
FIG. 6 is a diagram explaining an outline of image selection processing according to a modification example.

FIG. 6 is a diagram explaining an outline of image selection processing according to this modification example. As illustrated in FIG. 6, among a series of images 600-1 to 600-*n* (n is an integer of 3 or more) acquired by the camera 2, an object is detected in images 600-*k* to 600-*m* (k≥1, and, k<m≤n), and tracked (i.e., a period in which the images 600-*k* to 600-*m* are acquired is a tracking period). It is assumed that the tracked object is not detected in an image 600-*j* (k<j<m) during the tracking period, and a size of a region in which the tracked object is represented in any one image during the tracking period is equal to or more than a size threshold value. In this case, the image 600-*j* is selected.

Note that, during tracking of a detected object, the object may be temporarily hidden by another object. In such a case, since the tracked object is not represented on an image, the image is not necessarily suited for learning of a classifier. Thus, when another object is detected in an image in which, during a period in which tracking of an object is continued, the tracked object is not detected, and a centroid of an object region including the other object is located within a predetermined range from a centroid of an object region including the tracked object immediately before or immediately after the image, the selection unit 33 does not need to select an image in which the tracked object is not detected. In other words, only when another object is not detected in an image in which, during a period in which tracking of an object is continued, the tracked object is not detected, or a centroid of an object region including the other object is not located within the predetermined range from a centroid of an object region including the tracked object immediately before or immediately after the image, the selection unit 33 may select an image in which the tracked object is not detected.

According to still another modification example, when a period in which a detected object can be tracked is less than a predetermined period, the selection unit 33 may select any one of images acquired during the period. This is because there is a possibility that, when a period in which the detected object can be tracked is short, the object is erroneously detected.

Furthermore, a computer program that implements a function of each unit of the processor 23 of the image selection device according to the above-described embodiment or modification examples may be provided in a form of being recorded in a computer-readable portable recording medium such as a semiconductor memory, a magnetic recording medium, or an optical recording medium.

As described above, those skilled in the art may make various changes in conformity to an embodiment within the scope of the present invention.

What is claimed is:

1. An image selection device comprising:
 a processor configured to:
  input, for each of a series of images acquired from a camera mounted on a vehicle, the image to a classifier which has been learned in such a way as to detect an object, to detect an object represented on the image, and a region in which the object is included on the image;
  track the detected object over the series of images;
  select, when a tracking period in which the detected object is tracked is equal to or more than a predetermined period, and a size of a region including the detected object in any one image during the tracking period among the series of images is equal to or more than a predetermined size threshold value, among the series of images, an image immediately before the tracking period, or an image in which the tracked object is not detected during the tracking period; and
  store the selected image in a memory or transmit the selected image to another device via a communication device.

2. The image selection device according to claim 1, wherein, when a size of a region including the detected object in a first image in the tracking period is equal to or more than the predetermined size threshold value, the processor selects an image immediately before the tracking period.

3. The image selection device according to claim 1, wherein the classifier further outputs, for each of the series of images, a confidence score representing likelihood that an object is represented on the image and
 only when the confidence score for the tracked object is equal to or more than a predetermined confidence threshold value in an image immediately before the tracking period or an image in which the tracked object is not detected during the tracking period, the processor selects the image.

4. The image selection device according to claim 1, wherein the classifier further outputs a kind of the detected object for each of the series of images, and
 the processor is further configured to set the predetermined size threshold value according to the kind of the detected object.

5. The image selection device according to claim 1, wherein the classifier further outputs a kind of the detected object for each of the series of images, and
 the processor is further configured to store a kind of an object tracked during the tracking period, together with the selected image.

6. The image selection device according to claim 1, wherein, only when another object is not detected in an image in which the tracked object is not detected during the tracking period, or another object detected in images before and after an image in which the tracked object is not detected is not located within a predetermined range of the tracked object, the processor selects an image in which the tracked object is not detected.

7. An image selection method comprising:
 inputting, for each of a series of images acquired from a camera mounted on a vehicle, the image to a classifier which has been learned in such a way as to detect an object, to detect an object represented on the image, and a region in which the object is included on the image;
 tracking the detected object over the series of images;
 selecting, when a tracking period in which the detected object is tracked is equal to or more than a predetermined period, and a size of a region including the detected object in any one image during the tracking period among the series of images is equal to or more than a predetermined size threshold value, among the series of images, an image immediately before the tracking period, or an image in which the tracked object is not detected during the tracking period; and
 storing the selected image in a memory or transmitting the selected image to another device via a communication device.

8. An image selection device comprising:
 a processor configured to:
  input, for each of a series of images acquired from a camera mounted on a vehicle, the image to a classifier which has been learned in such a way as to detect an object, to detect an object represented on the image;

track the detected object over the series of images;

select, when a period in which the detected object is tracked is less than a predetermined period, any one image during the period among the series of images; and store the selected image in a memory or transmit the selected image to another device via a communication device.

* * * * *